(12) United States Patent
Schmatz et al.

(10) Patent No.: US 11,456,867 B2
(45) Date of Patent: Sep. 27, 2022

(54) TRUST-ANCHORING OF CRYPTOGRAPHIC OBJECTS

(71) Applicant: INTERNATIONAL BUSINESS MACHINES CORPORATION, Armonk, NY (US)

(72) Inventors: Martin Schmatz, Rueschlikon (CH); Navaneeth Rameshan, Zurich (CH); Patricia M. Sagmeister, Adliswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 16/663,445

(22) Filed: Oct. 25, 2019

(65) Prior Publication Data

US 2021/0126781 A1    Apr. 29, 2021

(51) Int. Cl.
| H04L 9/08 | (2006.01) |
| H04L 9/32 | (2006.01) |
| G06F 7/58 | (2006.01) |

(52) U.S. Cl.
CPC .......... *H04L 9/0869* (2013.01); *H04L 9/0877* (2013.01); *H04L 9/0891* (2013.01); *H04L 9/3268* (2013.01); *G06F 7/588* (2013.01)

(58) Field of Classification Search
CPC ... H04L 9/0869; H04L 9/0891; H04L 9/3268; H04L 9/0877; G06F 7/588
See application file for complete search history.

(56) References Cited

U.S. PATENT DOCUMENTS

| 7,979,707 B2* | 7/2011 | Rostin ................ H04L 9/3234 380/260 |
| 10,511,591 B2* | 12/2019 | Campagna ........... H04L 63/061 |
| 10,516,543 B2* | 12/2019 | Campagna ........... H04L 9/3093 |
| 2006/0177056 A1* | 8/2006 | Rostin ................ H04L 63/0853 380/46 |

(Continued)

FOREIGN PATENT DOCUMENTS

| EP | 1643675 A1 | 4/2006 |
| EP | 2597591 A2 | 5/2013 |
| EP | 3432509 A1 | 1/2019 |
| WO | 2018218349 A1 | 12/2018 |
| WO | 2021078617 A1 | 4/2021 |

OTHER PUBLICATIONS

Notification of Transmittal of the International Search Report and Written Opinion of the International Searching Authority, or the Declaration, International application No. PCT/EP2020/078999, Applicant's or agent's file reference P201809597, dated Jan. 20, 2021, 11 pages.

(Continued)

*Primary Examiner* — Cheng-Feng Huang
(74) *Attorney, Agent, or Firm* — Anthony Curro

(57) ABSTRACT

A method manages cryptographic objects (COs). The method includes accessing an entropy-based random number and instructing to store this random number. The method includes generating one or more COs based on a deterministic algorithm that causes to interact with a security module (SM), such as a hardware security module (HSM), to generate a seed according to both a reference key of the SM and the random number accessed. A random number generator is seeded with the generated seed to generate the desired COs.

29 Claims, 7 Drawing Sheets

(56) References Cited

U.S. PATENT DOCUMENTS

| | | | |
|---|---|---|---|
| 2006/0269063 A1* | 11/2006 | Hauge | H04N 21/23895 380/262 |
| 2009/0316907 A1* | 12/2009 | Cachin | H04L 9/083 380/278 |
| 2013/0136255 A1* | 5/2013 | Brown | H04L 9/001 380/28 |
| 2015/0063565 A1* | 3/2015 | Ansari | G06F 12/1408 380/44 |
| 2016/0065378 A1* | 3/2016 | Kim | H04L 9/3278 713/184 |
| 2018/0144147 A1* | 5/2018 | Nix | G06F 21/62 |
| 2018/0205536 A1* | 7/2018 | Tomlinson | H04L 9/0643 |
| 2018/0248691 A1* | 8/2018 | Henderson | H04L 63/10 |
| 2018/0288031 A1* | 10/2018 | Kumar | H04L 63/0807 |
| 2019/0081804 A1* | 3/2019 | Chen | H04L 9/3278 |
| 2019/0097794 A1* | 3/2019 | Nix | G06F 21/35 |
| 2019/0349208 A1* | 11/2019 | Merchan | H04L 9/3278 |
| 2019/0372779 A1* | 12/2019 | Monica | H04L 9/3239 |

OTHER PUBLICATIONS

Chalkias, "Blockchained Post-Quantum Signatures", IEEE, 2018, pp. 1-8.

Mell et al., "The NIST Definition of Cloud Computing", National Institute of Standards and Technology, Special Publication 800-145, Sep. 2011, pp. 1-7.

Utimaco, "Post-Quantum Cryptography: Secure Encryption for the Quantum Age", https://hsm.utimaco.com/download/post-quantum-cryptography-secure-e . . . , printed Aug. 28, 2019, pp. 1-5.

Menezes et al., "Chapter 13: Key Management Techniques", Chapter from the Handbook of Applied Cryptography, CRC Press, XP001525013, 1996, pp. 1-50.

Bos et al., "CRYSTALS—Kyber: a CCA-secure module-lattice-based KEM", 2018 IEEE European Symposium on Security and Privacy, pp. 1-15.

\* cited by examiner

TRUST-ANCHORING OF CRYPTOGRAPHIC OBJECTS

BACKGROUND

The invention relates in general to methods and systems for managing cryptographic objects (COs). In particular, it is directed to methods to generate COs through a reference key that is securely stored on and/or derived in a security module (SM) such as a hardware security module (HSM), wherein the methods allow the generated objects to be anchored to this reference key. Such methods notably allow a post-quantum secure generation of COs.

Key management relates to the management of cryptographic keys in a cryptosystem, which involves operations such as the generation, storage, use, destruction and replacement of keys. Key management requires specific cryptographic protocols, key servers, and other procedures.

A key management system (KMS) is a system that generates, distributes and, more generally, manages cryptographic keys for clients (e.g., devices, applications, etc.). A KMS may handle several aspects of security, ranging from secure generation of keys up to secure key handling and storage on the clients. A KMS typically includes a backend functionality for key generation, distribution, and replacement. It may further integrate specific client functionalities for injecting, storing, and managing keys on the clients.

Key management and key management systems are becoming increasingly important for the security of connected devices and applications with the development of the Internet of Things and cloud computing.

HSMs are physical computing devices that protect and manage COs such as encryption keys for performing cryptographic operations such as crypto-processing (e.g., encrypt, decrypt, wrap, unwrap, derive, etc.) and strong authentication. HSMs may typically handle symmetric keys (e.g., AES) and asymmetric keys (e.g., RSA, ECC). They are usually embodied as physical devices (e.g., plug-in cards) that typically attach directly to a computer (e.g., a network server) but may also be implemented in software.

HSMs typically comprise secure crypto-processor chips to prevent tampering and bus probing. In general, HSMs may be designed to provide tamper evidence and tamper resistance (e.g., to delete keys upon tamper detection). HSM systems are sometimes able to securely back up keys they manage. HSMs are typically clustered to provide high availability and, as such, conform to high-availability requirements of modern datacenter environments. HSMs may notably form part of infrastructures such as online banking applications and public key infrastructures.

Amongst other functions, a HSM may rely on specific hardware, which typically exploits a physical process, to create a sufficient source of randomness (e.g., characterized by entropy). The available randomness is, in turn, used to generate random keys.

The functionality of a HSM may be implemented in various ways, for example using a dedicated hardware appliance (preferably with tamper resistance), using a secure server, a software enclave, a trusted platform module (TPM), etc. Thus, various security modules (SM) may be contemplated, which may be used to provide, manipulate, and/or or manage COs.

WO 2018/218349A1 describes a HSM and the mechanism used to connect and use the HSM. For example, this reference may comprise two or more hardware ports each of which is operable to electronically receive given input hardware port-specific cryptographic data thereon to initiate execution of an internal cryptographic process. The reference may comprise two or more segregated hardware port-specific storage spaces each operatively linked to a corresponding one of the hardware porta via a hardware link. However, the reference only describes the mechanism behind a HSM and does not describe a crypto-anchor mechanism through a key pairing to the HSM.

EP 3 432 509 A1 describes a quantum key distribution system including controllers, networks, and channels. The reference relates to an encrypted channel establishment method as well as a communication protocol. However, the reference only describes the quantum key distribution mechanism and does not describe a crypto-anchor mechanism through a key pairing to the HSM.

The security of a network connectivity to a SM may be achieved in various ways, for example, by using quantum safe channel negotiation principles or physical protection from wire-tapping.

It is known that RSA and ECC public/private key pairs are not (or will not be) secure against attacks by a sufficiently powerful quantum computer running a Shor algorithm or a Grover algorithm. Those skilled in the art will understand that these algorithms may be well-matched to quantum computers. Such a security threat will be prevalent in the future, owing to the fast development of quantum computers. It is in fact already a reality if one considers wiretapping.

SUMMARY

According to a first aspect, the present invention is embodied as a method of managing cryptographic objects (COs). This method comprises accessing an entropy-based random number and instructing to store this random number (e.g., to be able to later re-access that same random number). The method comprises generating one or more COs based on a deterministic algorithm. The algorithm may be configured to interact with a security module (SM), such as a hardware security module (HSM), to generate a seed according to both a reference key of the SM and the random number accessed. The method comprises seeding a random number generator with the generated seed to generate the desired COs.

This method allows a trust-anchor to be achieved, whereby the cryptographic objects generated are anchored to the reference key that is securely stored on or derived, on purpose, at the SM. The method is accordingly configured for a secure generation of cryptographic objects, where only the random number used to generate such objects need be stored. The generated COs may be deleted entirely or at least partly after use, as the deterministic algorithm used by the method may be later called again to recreate the same objects, due to the stored random number and the availability of the reference key in the SM. This method may be used to generate post-quantum secure cryptographic keys.

In embodiments, the method further comprises using one or each of the one or more COs generated to perform a cryptographic operation and deleting one or more of the COs previously generated. Thanks to the deterministic scheme used and the fact that the random number has been stored, the previously generated objects (or part thereof) may be safely deleted.

Preferably, the method further comprises regenerating one or more previously deleted COs by accessing the previously stored random number, and, based on the same deterministic algorithm as previously used, interacting with the SM to regenerate the seed according to both the reference key and the previously stored random number. Thus, the random number generator may be seeded with the regenerated seed. Any COs accordingly regenerated may then be used to perform a cryptographic operation, if and as needed.

In embodiments, the SM institutes a key hierarchy and the above method further comprises, at the SM, deriving said reference key based on a key of a deeper key hierarchy level of this hierarchy, prior to generating the seed.

The method preferably relies on two random numbers. That is, said random number may be a first random number, while the method may further comprise, prior to generating the seed: accessing a second entropy-based random number; instructing to store the second random number; and interacting with the SM for it to derive said reference key using both the second random number and the key of the deeper key hierarchy level.

In preferred embodiments, the random number generator is seeded to generate two COs, these including a private key and a public key. Then, the method may further comprise sending out the public key and using the private key to perform a cryptographic operation.

Preferably, sending out the public key comprises sending the public key to a certificate authority for it to issue a digital certificate for said public key.

The steps of accessing the random number, generating the seed, and seeding the random number generator may be, for example, performed by a client communicating with said SM, whereby the public key is sent from the client to the certificate authority.

Preferably, the method further comprises instructing (e.g., at the client) to store the public key on an external storage system that is distinct from the client.

In particular, the method may further comprise: sending said random number to the certificate authority along with the public key for the certificate authority to issue one or more digital certificates for said public key and said random number; and, at the client, instructing to store the random number on a storage system (e.g., distinct from the client). When needed, the cryptographic objects may be recalled by the client and their authenticity may be checked by the client by certificates corresponding to such objects.

In embodiments, clients are configured as containers. In particular, the steps of accessing the random number, generating the seed, and seeding the random number generator are carried out in a container.

In preferred embodiments, the steps of the method are concurrently performed at each client of a set of clients, each communicating with a SM (e.g., either the same SM or respective SMs). In that case, the method comprises performing steps as described above at said each client. Namely, such steps include accessing an entropy-based random number, instructing to store this random number, and, based on a deterministic algorithm, interacting with a SM to generate a seed according to the random number accessed and a reference key of the SM, and seeding a random number generator with the generated seed to generate one or more COs.

In some application scenarios, the deterministic algorithm and the random number accessed are the same for each of the clients of the set, whereby the same one or more COs are generated at each of the clients of the set.

The method may further comprise steps of receiving entropy-based random numbers from one or more certificate authorities, concurrently at the clients and prior to accessing the entropy-based random number.

The method may comprise, at each of the clients of the set, using one or each of the one or more COs generated to perform a cryptographic operation.

In particular, the method may further comprise, after using said one or each of the one or more COs generated to perform said cryptographic operation: deleting said one or more of the COs; and receiving (possibly distinct) random numbers at the clients from one or more certificate authorities, wherein said random numbers correspond to same random numbers as initially accessed by the clients, such that the clients are able to regenerate the same one or more COs as previously generated.

Preferably, the method further comprises, prior to sending said random numbers to the clients, sending, from one or more certificate authorities, public keys of all of the clients to each of the clients, for each client to be configured to verify an authenticity of a random number received thereat. This mechanism enables an all-to-all communication channel to be established amongst the participating clients (e.g., containers), because it enables to regenerate key pairs used for channel encryption.

In embodiments, the method further includes instructing to generate (e.g., locally) said entropy-based random number, prior to accessing it.

Preferably, interacting with the SM comprises: forwarding the random number accessed to the SM; instructing the SM to generate the seed according to the random number forwarded to it and the reference key; and receiving the generated seed.

In preferred embodiments, said seed is generated by encrypting the random number using the reference key. The reference key as used to generate the seed is preferably a key pre-loaded on the SM. In embodiments, the SM further comprises a first key pre-loaded on the SM as a non-extractable token object, and the method further comprises: importing a second key in a wrapped state in the SM; using the first key to unwrap the second key; and using the unwrapped key to generate the seed.

According to another aspect, the invention is embodied as a computerized system for managing COs. The system comprises a random number generator, storage means storing instructions, as well as processing means configured to execute said instructions. In operation, this causes to access an entropy-based random number, instruct to store a random number accessed as per said instructions, and generate one or more COs based on a deterministic algorithm. As explained earlier, this algorithm causes the system to interact with a SM, to generate a seed according to a reference key of the SM and a random number accessed as per said instructions. Executing said instructions further causes to seed the random number generator with a seed as generated as per said instructions, to thereby generate desired COs, in operation of the system.

In preferred embodiments, the above system comprises a subsystem configured to interact with the SM, the latter distinct from said subsystem, for efficiency reasons.

According to a further aspect, the invention is embodied as a computer program product for managing COs. The computer program product comprises a computer readable storage medium having program instructions embodied therewith. The program instructions are executable by one or more processors, to cause to implement all the steps of a method such as described above.

Computerized systems, methods, and computer program products embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the exemplary embodiments. The following detailed description, given by way of example and not intended to limit the exemplary embodiments solely thereto, will best be appreciated in conjunction with the accompanying drawings, in which:

FIG. 2 illustrates steps as performed at a given client (configured as a container) interacting with a respective hardware security module (HSM), in accordance with the exemplary embodiments. FIG. 3 illustrates steps concurrently implemented at clients communicating with respective HSMs, in accordance with the exemplary embodiments. FIG. 4 is a detailed flowchart, illustrating steps performed at a given client, wherein the latter further interacts with a certificate authority, in accordance with the exemplary embodiments.

The accompanying drawings show simplified representations of devices or parts thereof, as involved in embodiments. Similar or functionally similar elements in the figures have been allocated the same numeral references, unless otherwise indicated.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF EMBODIMENTS OF THE INVENTION

Figure 1:
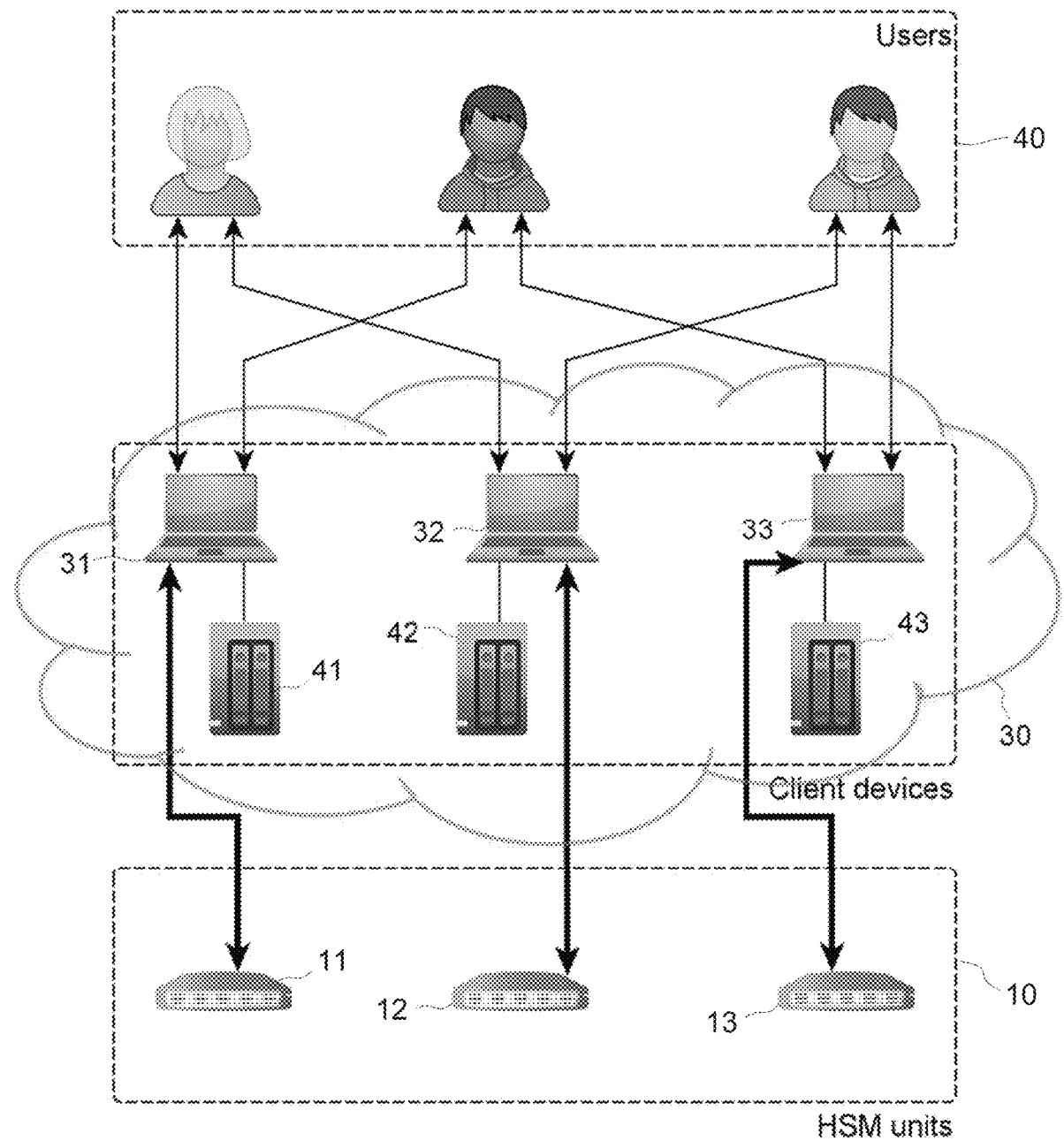
FIG. 1 is a block diagram schematically illustrating selected components of a computerized system that may be used to implement cryptographic methods as described herein, according to the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

While existing (legacy) hardware security modules (HSMs) are capable of generating and storing non-post-quantum secure (PQS) cryptographic objects (COs) such as public/private key pairs, such devices are typically not capable of generating PQS objects. In this endeavour, the exemplary embodiments provide methods for managing cryptographic objects (COs). Such methods may be used to crypto-anchor post-quantum secure (PQS) COs such as public/private key pairs to a legacy HSM. The exemplary embodiments being directed to the HSM is only for illustrative purposes. These methods may also apply to other types of security modules (SMs).

Such methods are described in detail in the following description, which is structured as follows. First, general embodiments and high-level variants are described (sect. 1). The next section addresses more specific embodiments and technical implementation details (sect. 2).

1. General Embodiments and High-Level Variants

Figure 2:
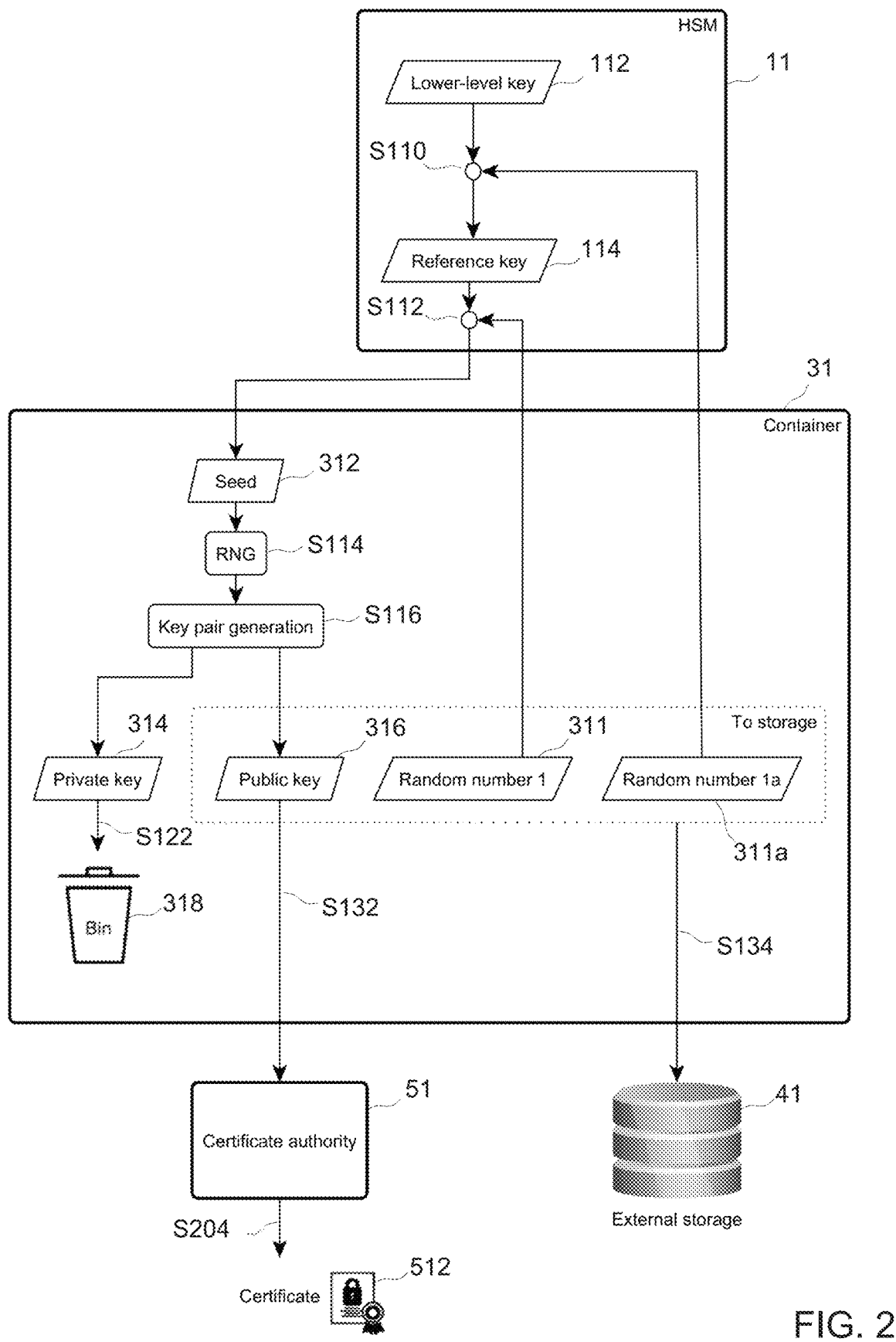
FIGS. 2-4 are flowchart diagrams illustrating high-level steps of particular methods of managing cryptographic objects (COs), as well as components involved in such methods, in accordance with the exemplary embodiments.
Figure 3:
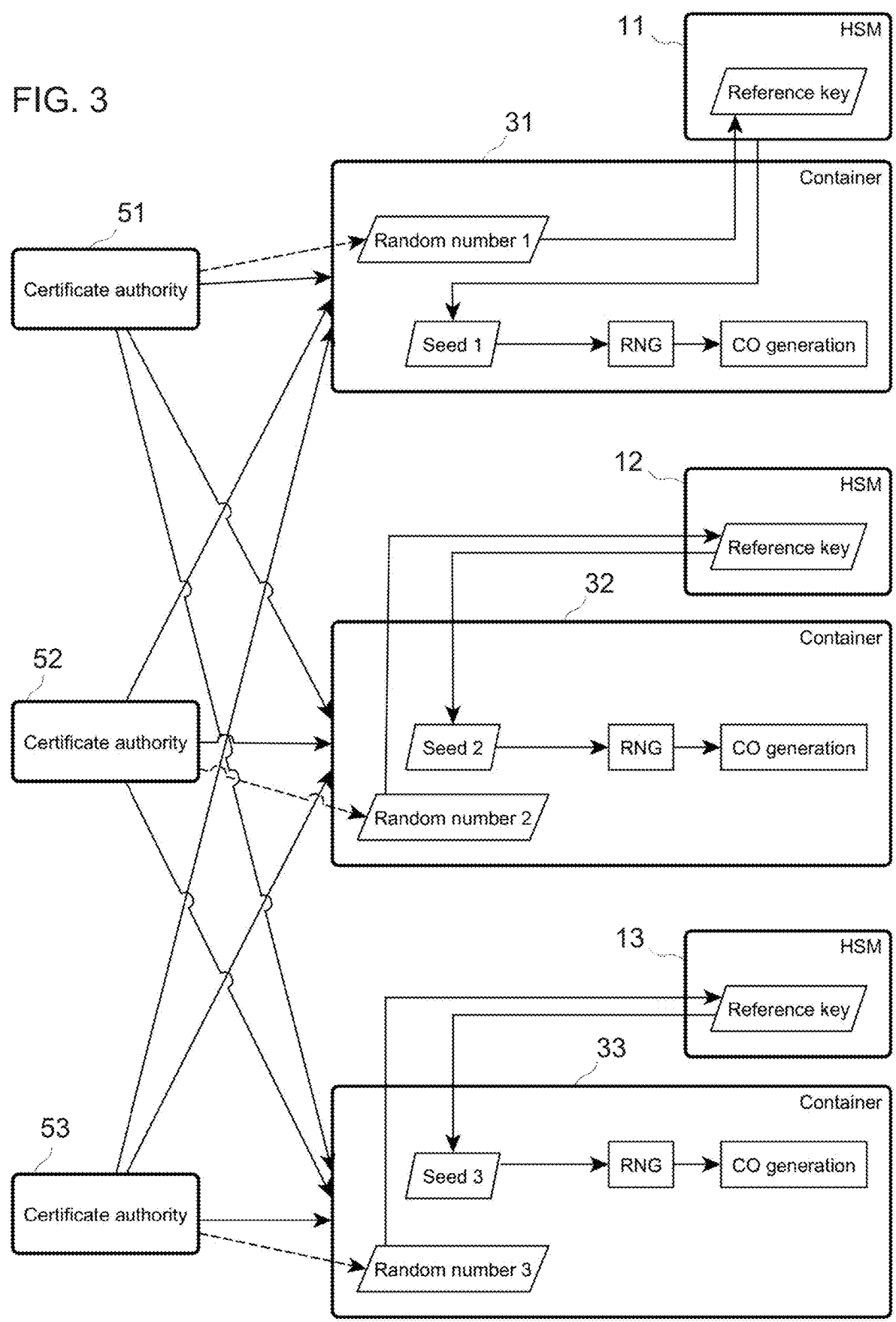
Figure 4:
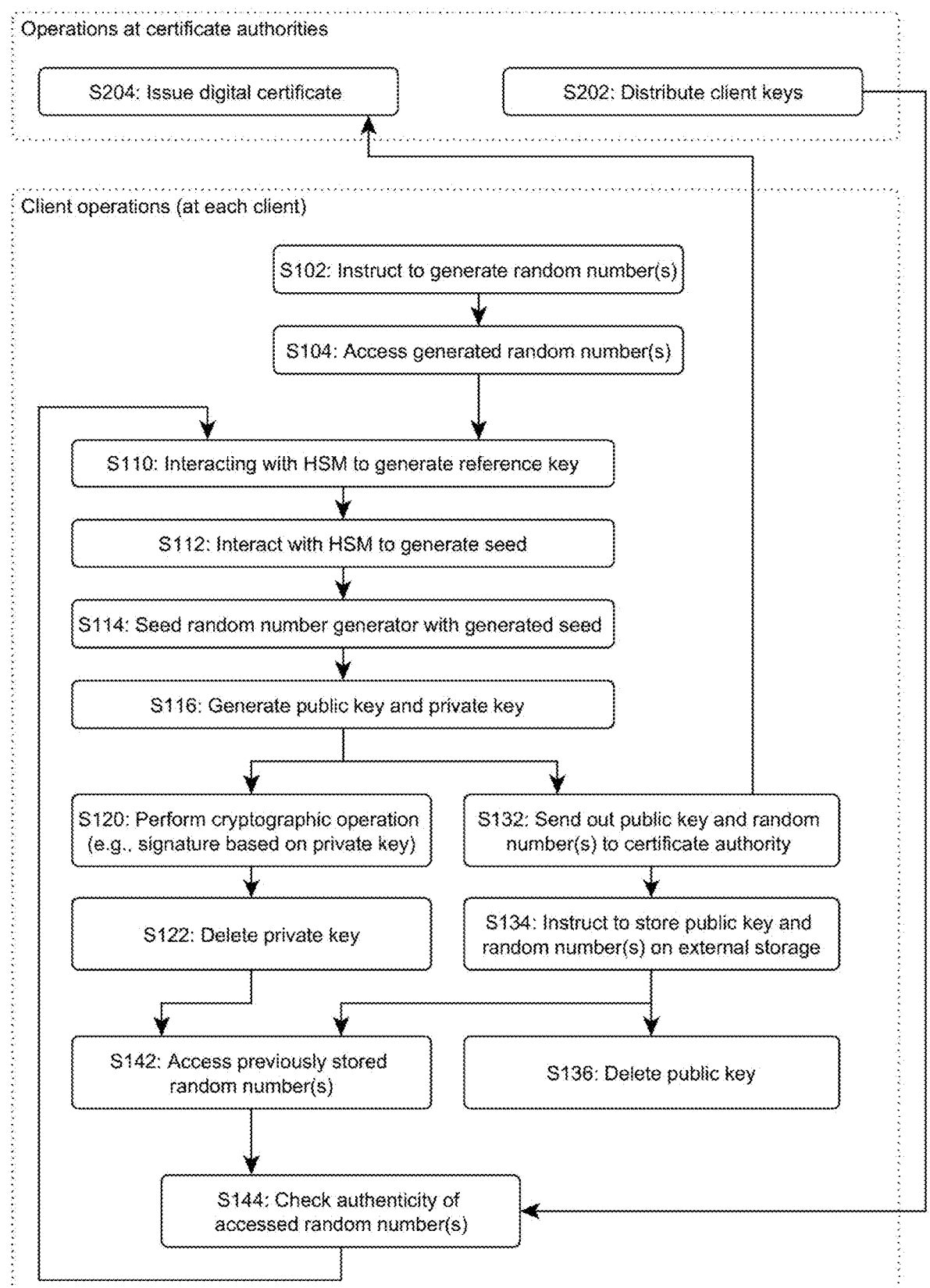

In reference to FIGS. 2-4, an aspect of the invention is first described, which concerns a method of managing COs 314, 316, which typically comprise cryptographic keys (e.g., wrapped keys) and/or initialization vectors (IVs). For example, as illustrated, the Cos 314, 316 may be a public key and a private key, respectively. The methods and its variants described herein are collectively referred to as the "present methods".

Such methods may be implemented in a computerized system 1 such as depicted in FIG. 1, which system is typically designed to enable clients 31-33 to interact with SMs 11-13 to obtain COs. As noted in the background section, the SMs may for example involve a dedicated hardware appliance (e.g., with tamper resistance), or be implemented at a secure server, as a software enclave, as a trusted platform module (TPM), or the like. Thus, various types of security modules may be contemplated in the present context, which may be used to provide, manipulate, and/or manage COs. As noted earlier too, the security of a network connectivity to such an SM may be achieved in various ways, for example by using quantum safe channel negotiation principles or physical protection from wiretapping. The SMs are assumed to be hardware security modules (HSMs) in the following, for the sake of illustration and without prejudice.

The clients 31-33 may, for example, be implemented in a cloud 30, e.g., as containers, virtual machines, or respective computer devices. The clients 31-33 typically interact with HSMs 11-13 of the system 1 on behalf of users 40 that otherwise interact (computationally speaking) with the clients 31-33. Such a system 1 concerns another aspect of the invention, which will be described later in detail. The various components are described in greater detail as a hardware implementation with reference to FIG. 5, as part of a cloud implementation with reference to FIG. 6, and/or as utilizing functional abstraction layers for processing with reference to FIG. 7.

The present methods are configured to the generation of COs. Such methods comprise accessing S104 an entropy-based random number 311. This random number 311 may be regarded as a nonce, which is typically not secure in a cryptographic sense. The number is generated using entropy, e.g., using a hardware-based random number generator. For example, the computerized entity used to generate this number may include hardware that exploits a physical process, in order to create a sufficient source of randomness, which is itself characterized by entropy. The exemplary embodiments may utilize any hardware-based entropy sources as those skilled in the art will understand. The available randomness may, in turn, be used to generate random numbers.

In performing further operations, the method instructs to store S134 the random number 311. Note, the random number 311 generated at S104 need not necessarily be generated locally, that is, by the same computerized entity (or entities) that is (are) otherwise used to generate the COs. Instead, this number may, for example, be generated by a given source and then accessed by an entity of the system 1 at S104, prior to being instructed to be stored by this entity for future use.

A deterministic algorithm (or process) is performed, e.g., by said entity (or entities), in order to generate S116 one or more COs 314, 316. This deterministic algorithm causes an entity (or entities) of the system 1 to interact S110-S112 with a hardware security module (HSM) 11-13, to generate S112 a seed 312. The seed is generated according to both a reference key 114 of the HSM 11-13 and the random number 311 accessed at step S104. An entity of the system 1 proceeds to seed S114 a random number generator with the generated seed 312, to generate S116 the COs 314, 316.

In practice, the present methods may be concurrently performed by interacting with several HSMs, e.g., HSMs that are clustered to provide high availability and, as such, conform to high-availability requirements of modern data center environments, as exemplified later in reference to FIG. 3.

The COs generated may typically consist of cryptographic keys and/or initialization vectors IVs. In the following, the COs generated are assumed to include one or two cryptographic keys, for simplicity. For example, at least one key may be generated, which may for instance be used for symmetric encryption purposes. If needed, a pair of keys may be generated, e.g., for asymmetric encryption operations.

In both cases, the present methods allow a secure generation of the cryptographic key(s). Such methods according to the exemplary embodiments allow a trust-anchor to be achieved, whereby the COs generated are anchored to the reference key 114 that is securely stored on or derived, on purpose, at the HSM 11-13.

Such methods may be used to generate post-quantum secure cryptographic keys. Security stems from the fact that only the random number that is used to generate such keys need be stored. The generated keys may be deleted after use (at least partly, e.g., the private key 314 of a public-private key pair may be deleted), inasmuch as the same deterministic algorithm may be later called again to recreate the same COs, due to the stored random number and the availability of the reference key in the HSM. Accordingly, the algorithm (or process) used may be deterministic, from stem to stern. That is, the sequence of steps involved to generate the seed 312 and the COs may all be deterministic, such that reusing a same random number and a same reference key as input to the process will again lead to the same COs.

The deterministic algorithm may be regarded as computerized process, which is at least partly executed by an entity 31 interacting with a HSM 11, and possibly partly by the HSM 11 itself (e.g., to generate S112 the seed 312), as assumed in FIG. 2. For example, said entity 31 may use the seed 312 generated S112 by the HSM 11 to seed S114 the random-number generator, which may reside outside the HSM, as further assumed in FIG. 2. Thus, one understands that several entities (typically consisting of a client interacting with an HSM) will likely be involved to perform steps of the present methods.

Various architectures may actually be contemplated, as the one skilled in the art will realize. In particular, S110-S116 may be implemented within a HSM, or within each HSM of a set of HSMs (contrary to the assumption made in FIGS. 2-4). The present scheme may be implemented by a computerized system 1, wherein one or more entities 31-33 interact with one or more HSMs, for performance reasons. This is due to the fact that hardware HSMs typically have more limited resources and performance than classical computerized systems (such as the subsystem 30) interacting with such HSMs 10. Thus, some of the steps S110 to S116 (e.g., S114 and S116 in FIG. 2) are preferably performed by such entities 31-33, or, more generally, by a subsystem 30 interacting with HSMs.

The random number 311 may be stored prior to or after S134 generating S112 the seed 312. In that respect, the present methods may further include a step of instructing S102 to generate this random number. This number may possibly be locally generated, e.g., at a same computerized entity 31-33 as used to interact with the HSM 11-13). In variants, this number may be generated by another application, possibly at another device (or entity) of the system 1, etc.

In further detail of the above methods, interactions S110-S112 with the HSM 11-13 shall preferably decompose according to the following. The random number 311 accessed at S104 (see FIG. 4) is forwarded S110 by a given entity 31 (e.g., a client, possibly configured as a container) to the HSM (see FIG. 2). Then, the HSM is instructed S112 to generate the seed 312 according to the random number 311 forwarded to it and the reference key 114 (which typically resides in or is derived by the HSM). The generated seed 312 is received at the requesting entity 31-33, see FIG. 2 or 4.

As noted above, other architectures may be contemplated. For example, the seed may be generated S112 outside the HSM (though based on the reference key residing or obtained in the HSM), contrary to the scheme assumed in FIG. 2.

The seed 312 may be generated S112 by encrypting the random number 311 using the reference key 114. That is, the seed is normally generated inside the HSM in that case. Now, beyond encryption algorithms, various other algorithms are known (including scrambling and permutation algorithms), which have various security and performance characteristics and may be used to obtain the seed 312.

Amongst other possible algorithms, one may use the HMAC, GMAC, CMAC, SHA1, SHA2, SHA3, mod-mul, or bitwise XOR algorithms, or any combination thereof.

In embodiments, the reference key used to generate the seed 312 is a key pre-loaded on the HSM. For example, one may have an AES key pre-loaded on the HSM, and use this key as the basis for deriving the seed. Having the key pre-loaded on the HSM makes it possible to improve performance. The pre-loaded key may require being extractable (as per, e.g., the PKCS #11 standard) as well, which presents a security risk. If the pre-loaded key is non-extractable as per PKCS #11, then the derived key is also not extractable. However, it may be reproduced at any time by repeating the above key derivation process using the same pre-loaded key and same derivation entropy.

A more sophisticated approach may also be utilized. For example, the HSM may store a first key pre-loaded on the HSM as a non-extractable token object. A second key is imported in a wrapped state in the HSM; the first key is used to unwrap the second key and the unwrapped key obtained is finally used to generate S112 the seed 312. That is, one may for example rely on an AES key, pre-loaded on the HSM as a non-extractable token object, and use this key to unwrap a pre-existing, externally stored AES key, and then use the unwrapped key with attributes DERIVE=YES to derive the seed as described above. An advantage is that the key used as the basis for the derivation exists outside the HSM only in encrypted form.

As illustrated in FIGS. 2 and 4, one or each of the COs 314, 316 generated at S116 may for example be used to perform S120 a cryptographic operation (e.g., upon request of a client 31). The cryptographic operation performed may, for example, be a signature operation or a key encapsulation operation. Then, one or more of the COs 314, 316 previously generated S116 may be deleted S122, S136 (e.g., into bin 318). Through the deterministic scheme used and the random number 311 having been stored, the COs (or part thereof) may safely be deleted.

In practice, one or more previously deleted COs 314, 316 may typically come to be regenerated S142-S116 by accessing S142 the previously stored random number 311 and re-running the same deterministic algorithm as before. That is, an entity 31-33 may, for example, interact S110-S112 again with the HSM 11-13 to regenerate the seed 312 according to both the reference key 114 and the previously stored random number 311, in view of seeding S114 the random number generator with the regenerated seed 312. Eventually, one or more of the COs 314, 316 as regenerated may be used to perform S120 a further cryptographic operation, and so on. One or more of the regenerated COs may optionally be deleted.

In embodiments, the system 1 is configured as a hierarchical key management system (HKMS), e.g., a key management system (KMS) that relies on a key hierarchy extending from a ground level $l_0$ (typically corresponding to a master key, residing in plain form only inside a HSM). As per the key hierarchy, a key of a deeper key hierarchy level (e.g., assuming the master key on the ground level) is used to encrypt/wrap or decrypt/unwrap a key for an upper key hierarchy level. For example, the master key may be used to wrap/unwrap so-called "tenant" keys on a next level, while the tenant keys are used to wrap/unwrap so-called "project" keys on a further level. Project keys, in turn, are used to encrypt/decrypt data.

One or each HSM 11-13 may institute a key hierarchy extending from the ground level $l_0$ of this hierarchy. The master key residing in plain form in a HSM 11 may be considered to be the unique member at the ground level $l_0$ of the key hierarchy instituted by this HSM, while higher-level keys are (meant to be) stored (in wrapped form) outside the HSM 11. This hierarchy may be regarded as an arborescence, defining a rooted tree that extends from the ground-level (e.g., corresponding to the master key) to higher key levels in the hierarchy. With this definition, a lower-level key is closer to the master key level than a higher-level key. Accordingly, the reference key 114 may possibly be derived S110, at the HSM 11-13, based on a key 112 of a deeper key hierarchy level, prior to generating the seed 312, as in FIG. 2.

In embodiments, several random (e.g., entropy-based) numbers 311, 311a may be used in a HSM, as illustrated in FIG. 2. For example, a first random number 311 and a second random number 311a may be accessed at step S104, prior to generating the seed 312, and the present method may further instruct S134 to store each of the random numbers accessed. In that case, interactions S110-S112 with the HSM 11-13 cause the latter to derive S110 the reference key 114 using both the second random number 311a and the key 112 (from the deeper key hierarchy level). The reference key 114 obtained may then be used to generate S112 the seed, as discussed earlier. Therefore, the first random number 311 is used to obtain the seed 312 from the reference key 114, while the latter is derived from a lower key (e.g., a master key) of the HSM, due to a second random number 311a. The second number 311a may actually be the first number used, chronologically speaking. The same scheme may be adapted to any level of the hierarchical system instituted at the HSM. If the reference key needed to obtain the seed is at $n^{th}$ level, then n+1 entropy numbers may be used, including n numbers to successively derive the n keys up to the reference key, plus an additional number to obtain the seed (assuming the master key resides on the ground level such as level 0 of the hierarchy).

In embodiments, the random number generator is seeded S114 so as to generate S116 two COs 314, 316, these including a private key 314 and a public key 316. The public key 316 may be sent out S132, e.g., to a certificate authority 51-53 for it to issue S204 a digital certificate 512 for the public key 316, while the private key 314 may be used to perform S120 a given cryptographic operation. Again, the private key 314 may optionally be deleted S122 at this point, as assumed in FIGS. 2 and 4.

As evoked earlier, the steps of accessing the random number 311, generating the seed 312, and seeding the random number generator may all be performed by a client 31-33 communicating with said HSM 11-13. More generally, various steps may be performed at a client 31-33, as assumed in FIG. 4. In particular, the client 31-33 may typically send S132 the public key 316 to the certificate authority 51-53. The client 31-33 may otherwise instruct to store S134 a public key 316 on an external storage system 41-43 that is physically distinct from the client 31-33. In variants, the public key 316 may also be deleted S136, since it may anyway be regenerated.

In embodiments, the present methods further comprise sending S132 the random number(s) 311, 311a to the certificate authority 51-53, along with the public key 316, so as for the certificate authority to issue S204 one or more digital certificates 512 for said public key and said random number(s) 311. Meanwhile, a client 31-33 may instruct to store S134 the random number(s) 311 on a storage system (again, physically distinct from the client 31-33). This storage system may possibly be the same system 41-43 as used to store S134 the public key 316, though distinct storage systems may be used, in variants within the scope of the exemplary embodiments. One or more certificates 512 may thus be obtained for each of the random numbers needed (where several numbers are involved). According to an illustrative exemplary embodiment, a unique certificate is used for the public key 316 and the random number(s).

In all cases, the public key 316 and the random numbers may be stored on another location, after having obtained all necessary certificates. When needed, such objects may be recalled at the client 31-33 and their authenticity be checked by the client thanks to the certificates obtained.

As evoked earlier, the clients 31-33 are preferably configured as containers, e.g., implemented at distinct devices, or as virtual machines. Such containers may possibly be secured in enclaves. More generally though, the clients may be configured as applications, and be or involve virtual machines, and/or respective computer devices.

Referring now more specifically to FIG. 3, S102-S144 may, in embodiments, be concurrently performed at each client 31 of a set of clients 31-33, where each client communicates with a HSM 11-13. In that case, the method comprises, at each client 31, steps of accessing S104 an entropy-based random number 311, instructing to store S134 this random number 311, and, based on a deterministic algorithm (which may possibly differ from one client to another), interacting S112-S116 with a HSM 11-13 in view of generating one or more COs 314, 316, as described earlier in reference to FIGS. 2 and 4. Again, the COs 314, 316 generated may be used to perform S120 cryptographic operations.

Again, the random numbers 311 accessed S104 may be locally generated S102, if needed. During subsequent cycles, the random numbers may be received S104 from one or more certificate authorities 51-53, provided they have been instructed to be stored thereon during a previous cycle, as explained earlier.

Although the above steps are concurrently performed at the clients 31-33, they are not necessarily concomitant nor synchronous. According to an exemplary embodiment, clients 31-33 may interact with respective HSMs 11-13. In another exemplary embodiment, clients 31-33 may interact with the same HSM.

The deterministic algorithm used by the clients (and the corresponding HSM(s)) and the random number 311 accessed may possibly be the same for each of the clients 31-33, whereby the same COs 314, 316 are generated at each of the clients. And again, although such objects are generated in parallel at the clients, they are not necessarily generated synchronously or in a concomitant manner. Thus, in embodiments, the same private key may be regenerated at each of the containers. Being able to generate the same COs at distinct clients is useful in some scenarios, for example, load balancing, hot standby, fail-over, migration, etc.

As noted above, one or more of the COs 314, 316 (re-)generated may optionally be deleted S122, S136, see FIGS. 2 and 4, at any or each of the clients, after having used such COs to perform S120 the needed cryptographic operations. After deletion S122, S136 of the COs, the random numbers 311 may nevertheless be received S104 at the clients 31-33, e.g., from one or more certificate authorities 51-53, wherein said random numbers correspond to random numbers as initially accessed by the clients 31-33, so as for the clients to be able to regenerate the same COs 314, 316 as previously generated.

Prior to sending said random numbers to the clients 31-33, certificate authorities 51-53 may send S202 public keys of all of the clients to each of the clients, for each client to be able to verify an authenticity of a random number 311 received thereat, as assumed in FIG. 3. An all-to-all communication channel may be established amongst the participating clients (e.g., containers). Such public keys may be authenticated via the public signature keys of the certificate authority.

Figure 5:
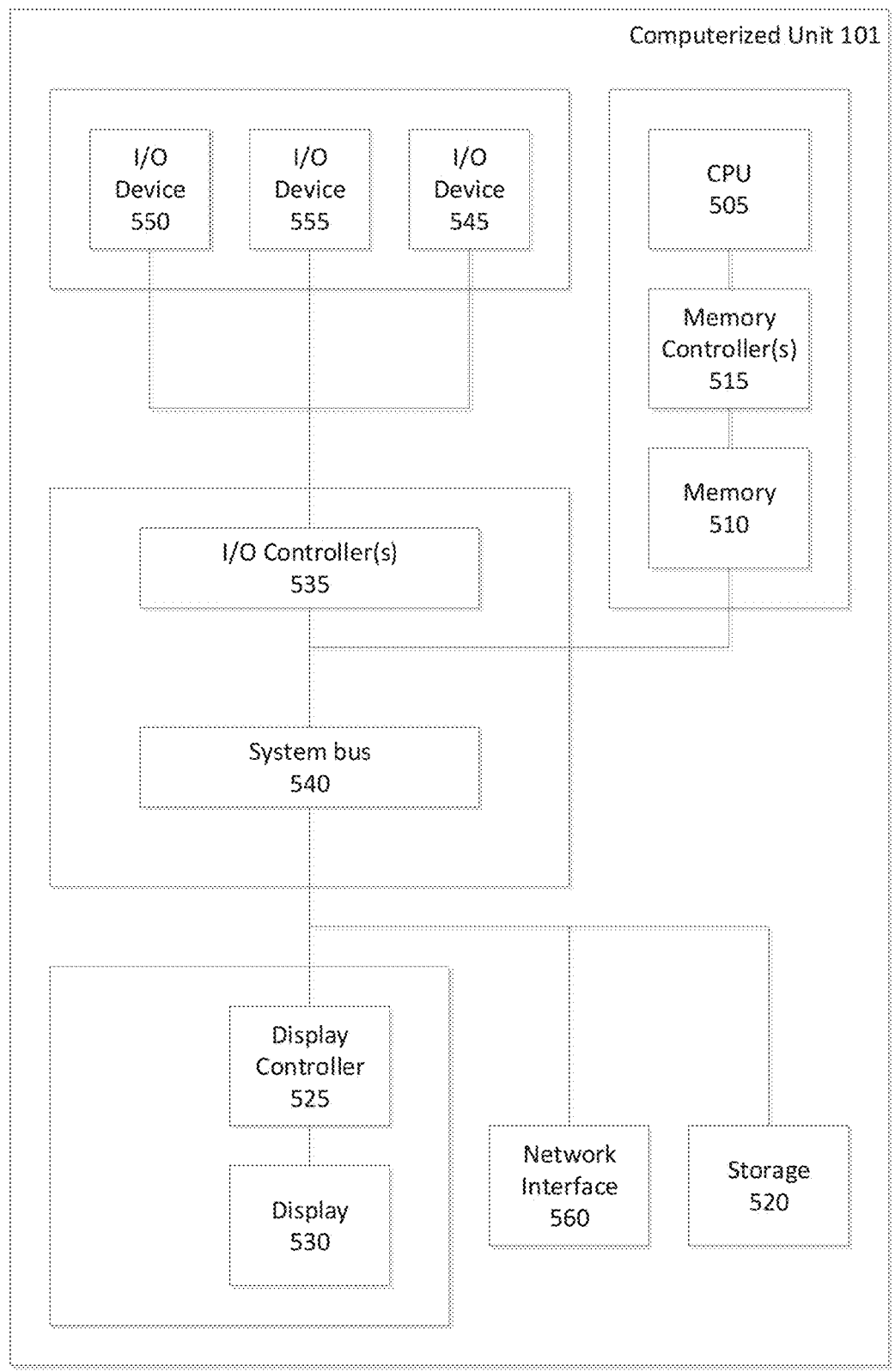
FIG. 5 schematically represents a general-purpose computer, as may be involved in a computerized system such as shown in FIG. 1, e.g., at the clients, at the external storage systems, or even to emulate HSMs, in accordance with the exemplary embodiments.

Referring to FIGS. 1 and 5, another but related aspect of the invention is now described, which concerns a computerized system 1 for managing COs. As mentioned earlier, the system 1 may typically be implemented as a HKMS or a subsystem of a HKMS. Main aspects of such a system 1 have already been discussed earlier, with reference to the present methods. Therefore, the present system 1 is only briefly described in the following.

The system may notably comprise one or more computerized units 101 such as shown in FIG. 5. In all cases, the system comprises processing means 505 and a random number generator, where the latter may possibly be provided by the processing unit 505. The system further includes storage means 510, which stores instructions embodying computerized methods such as described above. The processing means 505 are notably configured to execute said instructions, so as to perform steps as described earlier in reference to the present methods, e.g., access an entropy-based random number 311, instruct to store a random number 311 accessed as per said instructions, and interact with a HSM, in view of generating one or more COs 314, 316, in operation.

As noted earlier, although the HSM may form part of the overall system 1 (as assumed in FIG. 1), the system 1 preferably comprises a subsystem 30 (e.g., comprising one or more computerized units 101), configured to communicate with (and thus interact with) an external HSM 11-13, distinct from said subsystem 30, for performance reasons evoked earlier.

As illustrated in FIG. 1, the overall system 1 typically comprises one or more HSMs 11-13 (preferably several HSMs), as well as clients 31-33 configured to interact with the set of HSMs 11-13, on behalf of users 80, as discussed earlier. Preferably, there is a one-to-one mapping between clients 31-33 and HSMs 11-13. One of the clients 31-33 may interact with one HSM at a time, be it to ease implementation and resource management. Other architectures may, however, be contemplated.

The computerized clients 31-33 may for instance have access to respective external storage media 41-43. The external storage media 41-43 are, for example, attached to or in close data communication with the clients 31-33. Such media 41-43 still reside in the client space (and not in the users' space), where COs may still be relatively safely stored, as assumed in FIG. 1. The external storage media 41-43 may for instance each include a database. But again, other architectures may be contemplated.

Next, according to a further aspect, the exemplary embodiments may be embodied as a computer program product for managing COs. This computer program product comprises a computer readable storage medium having program instructions embodied therewith, where the program instructions are executable by one or more processors (e.g., of one or more units 101 such as depicted in FIG. 5), to cause the latter to take steps according to the present methods. Aspects of the present computer programs are discussed in detail in sect. 2.2.

This program may for instance be run jointly at the clients and the HSMs (in a more or less delocalized fashion). In addition, this program may possibly involve a controller interacting with both the clients and HSMs. Many possible architectures may be contemplated, as the person skilled in the art will appreciate.

The above embodiments have been succinctly described in reference to the accompanying drawings and may accommodate a number of variants. Several combinations of the above features may be contemplated. For example, preferred embodiments aim at using a known (but cryptographically non-secure) entropy to securely derive a key on a HSM, and using the result to seed a random number generator, which is then used to generate a PQS key pair. To crypto-anchor a PQS key pair to a HSM, a key is made available on a given HSM (preferably a symmetrical AES key) and an entropy input is used to derive a key from this first key and this entropy number is stored. The output of the above key derivation is used as entropy to seed the random number generator, to generate the PQS public/private key pair. The PQS key pair is used for a cryptographic operation (e.g., for signature or key encapsulation) and then deleted. Whenever the key pair is needed again, one recreates the key pair by retrieving the stored entropy and deriving a key using the on-HSM key. The derived key is then used to seed the random number generator, to re-create the PQS key pair. After use, the latter may possibly be deleted, and so on.

The PQS key pair does not have to be stored since all the ingredients necessary to recreate this key pair are stored or otherwise available. The PQS key pair, however, cannot be recreated without having access to the HSM. Using such a scheme, legacy HSMs may be used to crypto-anchor PQS key pairs on the HSMs.

2. Specific Embodiments—Technical Implementation Details

2.1 Cloud Implementations

It is to be understood that although this disclosure refers to embodiments involving cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
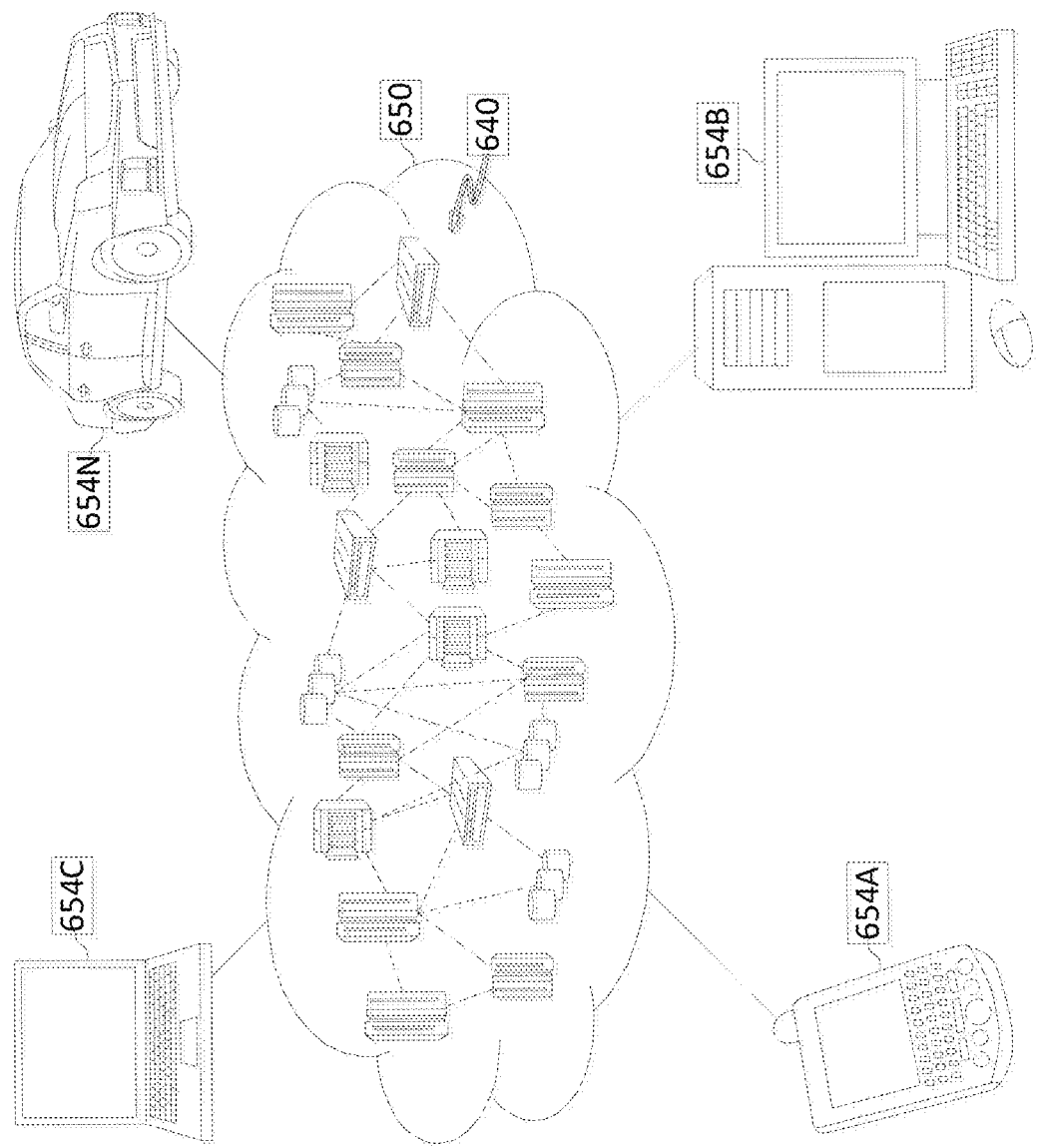
FIG. 6 depicts a cloud computing environment, in accordance with the exemplary embodiments.

Referring now to FIG. 6, illustrative cloud computing environment 650 is depicted. As shown, cloud computing environment 650 includes one or more cloud computing nodes 640 with which local computing devices used by cloud consumers, such as, for example, personal digital assistant (PDA) or cellular telephone 654A, desktop computer 654B, laptop computer 654C, and/or automobile computer system 654N may communicate. Nodes 640 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 640 and cloud computing environment 650 can communicate with any type of computerized device over any type of network and/or network addressable connection (e.g., using a web browser).

Figure 7:
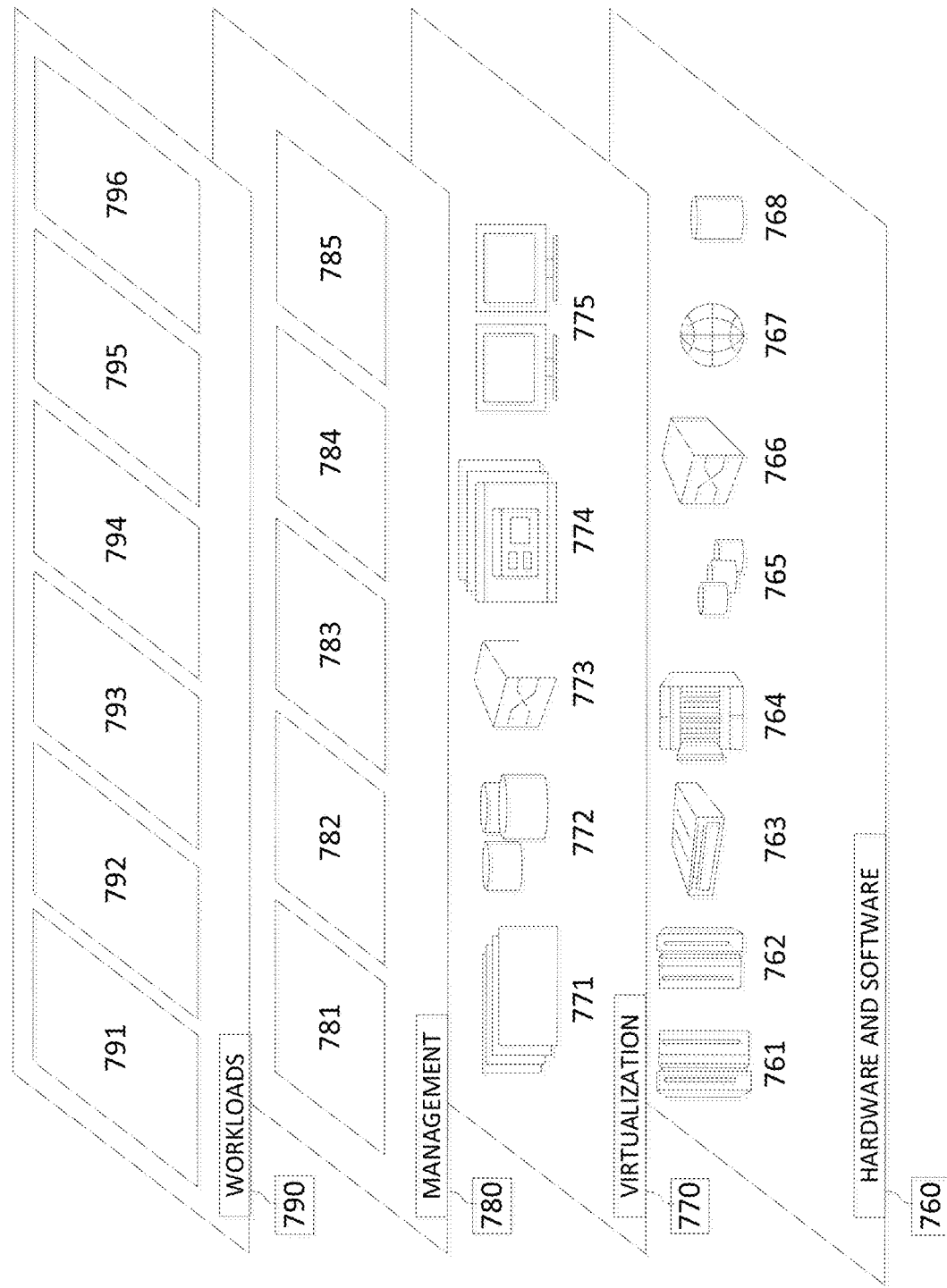
FIG. 7 depicts abstraction model layers, in accordance with the exemplary embodiments.

Referring now to FIG. 7, a set of functional abstraction layers provided by cloud computing environment 650 (FIG. 6) is shown. It should be understood in advance that the components, layers, and functions shown in FIG. 7 are intended to be illustrative only and the exemplary embodiments are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and image processing 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

2.2 Systems, Methods and Computer Program Products

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

2.3 Example of Suitable Computerized Units

Computerized devices may be suitably designed for implementing embodiments of the present invention as described herein. For instance, the computerized unit 101 depicted in FIG. 5 schematically represents a general-purpose computer. In exemplary embodiments, in terms of hardware architecture, as shown in FIG. 5, the unit 501 includes a processor 505, memory 510 coupled to a memory controller 515, and one or more input and/or output (I/O) devices 545, 550, 555 (or peripherals) that are communicatively coupled via a local input/output controller 535 via a system bus 540. The input/output controller 535 may be, but is not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 505 is a hardware device for executing software, particularly that stored in memory 510. The processor 505 may be any custom made or commercially available processor, a central processing unit (CPU), an auxiliary processor among several processors associated with the computer 501, a semiconductor-based microprocessor (in the form of a microchip or chip set), or generally any device for executing software instructions.

The memory 510 may include any one or combination of volatile memory elements (e.g., random access memory) and nonvolatile memory elements. Moreover, the memory 510 may incorporate electronic, magnetic, optical, and/or other types of storage media. Note that the memory 510 may have a distributed architecture, where various components are situated remote from one another, but may be accessed by the processor 505.

The software in memory 510 may include one or more separate programs, each of which comprises an ordered listing of executable instructions for implementing logical functions. In the example of FIG. 5, the software in the memory 510 includes methods described herein in accordance with exemplary embodiments and a suitable operating system (OS) 111. The OS 111 essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 510, so as to operate properly in connection with the OS 111. Furthermore, the methods may be written as an object-oriented programming language, which has classes of data and methods, or a procedure programming language, which has routines, subroutines, and/or functions.

Possibly, a conventional keyboard 550 and mouse 555 may be coupled to the input/output controller 535. Other I/O devices 545-555 may include other hardware devices.

In addition, the I/O devices 545-555 may further include devices that communicate both inputs and outputs. The system 100 may further include a display controller 525 coupled to a display 530. In exemplary embodiments, the system 100 may further include a network interface or transceiver 560 for coupling to a network. The network transmits and receives data between the unit 101 and external systems. The network is possibly implemented in a wireless fashion, e.g., using wireless protocols and technologies, such as WiFi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network may also be an IP-based network for communication between the unit 101 and any external server, client and the like via a broadband connection. In exemplary embodiments, network may be a managed IP network administered by a service provider. Besides, the network may be a packet-switched network such as a LAN, WAN, Internet network, etc.

If the unit 101 is a PC, workstation, intelligent device or the like, the software in the memory 510 may further include a basic input output system (BIOS). The BIOS is stored in ROM so that the BIOS may be executed when the computer 101 is activated.

When the unit 101 is in operation, the processor 505 is configured to execute software stored within the memory 510, to communicate data to and from the memory 510, and to generally control operations of the computer 101 pursuant to the software. The methods described herein and the OS 111, in whole or in part are read by the processor 505, typically buffered within the processor 505, and then executed. When the methods described herein are implemented in software, the methods may be stored on any computer readable medium, such as storage 520, for use by or in connection with any computer related system or method.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above may be contemplated.

What is claimed is:

1. A method of managing cryptographic objects, the steps being concurrently performed at each client of a set of clients communicating with a respective hardware security module (HSM), the method, at each client, comprising:
concurrently at the clients, receiving entropy-based random numbers from one or more certificate authorities;
accessing, by a first entity, an entropy-based random number generated by a second entity subsequent to receiving the entropy-based random numbers;
instructing to store the random number on the first entity; and
based on a deterministic algorithm:
interacting with the HSM to generate a seed according to both a reference key of the HSM and the random number, the reference key of the HSM being one of residing in or derived by the HSM, the random number being stored in the HSM; and
seeding a random number generator with the generated seed to generate one or more post-quantum secure cryptographic objects that are trust anchored to the reference key of the HSM.

2. The method according to claim 1, further comprising:
using at least one of the one or more cryptographic objects to perform a cryptographic operation; and
deleting one or more of the cryptographic objects previously generated.

3. The method according to claim 2, further comprising:
regenerating one or more previously deleted cryptographic objects by:
accessing the stored random number; and
based on the deterministic algorithm:
interacting with the HSM to regenerate the seed according to both the reference key and the previously stored random number; and
seeding the random number generator with the regenerated seed, and
using one or more of the one or more previously deleted cryptographic objects that were regenerated to perform the cryptographic operation.

4. The method according to claim 1, further comprising:
at the HSM, deriving said reference key based on a key of a deeper key hierarchy level of a key hierarchy in the HSM, prior to generating the seed.

5. The method according to claim 4, wherein said random number is a first random number, and
the method further comprises, prior to generating the seed:
accessing a second entropy-based random number;
instructing to store the second random number; and
interacting with the HSM for it to derive said reference key using both the second random number and the key of the deeper key hierarchy level.

6. The method according to claim 1, wherein the random number generator is seeded to generate two cryptographic objects including a private key and a public key, and
the method further comprises:
sending out the public key and using the private key to perform a cryptographic operation.

7. The method according to claim 6, wherein sending out the public key comprises sending the public key to a certificate authority for it to issue a digital certificate for said public key.

8. The method according to claim 7, wherein accessing the random number, generating the seed, and seeding the random number generator are performed by a client communicating with said HSM, whereby the public key is sent from the client to the certificate authority.

9. The method according to claim 8, further comprising:
at the client, instructing to store the public key on an external storage system that is distinct from the client.

10. The method according to claim 9, further comprising:
sending said random number to the certificate authority along with the public key for the certificate authority to issue one or more digital certificates for said public key and said random number, and
at the client, instructing to store the random number on a storage system distinct from the client.

11. The method according to claim 1, wherein the steps of accessing the random number, generating the seed, and seeding the random number generator are carried out in a container.

12. The method according to claim 1, wherein the deterministic algorithm and the random number accessed are the same for each of the clients of the set, whereby the same one or more cryptographic objects are generated at each of the clients of the set.

13. The method according to claim 1, further comprising:
at each of the clients of the set, using one or each of the one or more cryptographic objects generated to perform a cryptographic operation.

14. The method according to claim 13, further comprising:
after using said one or each of the one or more cryptographic objects generated to perform said cryptographic operation, deleting said one or more of the cryptographic objects; and
receiving random numbers at the clients from one or more certificate authorities, wherein said random numbers correspond to random numbers as initially accessed by the clients, so as for the clients to be able to regenerate the same one or more cryptographic objects as previously generated.

15. The method according to claim 13, further comprising:
prior to sending said random numbers to the clients, sending, from one or more certificate authorities, public keys of all of the clients to each of the clients, for each client to be able to verify an authenticity of a random number received thereat.

16. The method according to claim 1, further comprising:
prior to accessing said entropy-based random number, instructing to generate said entropy-based random number.

17. The method according to claim 1, wherein interacting with the HSM comprises:
forwarding the random number accessed to the HSM;
instructing the HSM to generate the seed according to the random number forwarded to it and the reference key; and
receiving the generated seed.

18. The method according to claim 1, wherein said seed is generated by encrypting the random number using the reference key.

19. The method according to claim 1, wherein the reference key as used to generate the seed is a key pre-loaded on the HSM.

20. The method according to claim 1, wherein the HSM further comprises a first key pre-loaded on the HSM as a non-extractable token object, and
the method further comprises:
importing a second key in a wrapped state in the HSM;
using the first key to unwrap the second key; and
using the unwrapped key to generate the seed.

21. A computerized system for managing cryptographic objects, the system comprising:
a random number generator;
storage means storing instructions; and
a hardware processing means configured to execute said instructions being concurrently performed at each client of a set of clients communicating with a respective hardware security module (HSM), so as, at each client, to:
concurrently at the clients, receive entropy-based random numbers from one or more certificate authorities;
access an entropy-based random number as generated by a further computerized system subsequent to receiving the entropy-based random numbers;
instruct to store the random number accessed as per said instructions on the computerized system; and
based on a deterministic algorithm:
interact with the HSM to generate a seed according to a random number accessed as per said instructions and a reference key of the HSM, the reference key of the HSM being one of residing in or derived by the HSM, the random number being stored in the HSM; and
seed the random number generator with a seed as generated as per said instructions and generate one or more post-quantum secure cryptographic objects that are trust anchored to the reference key of the HSM.

22. The computerized system according to claim 21, further comprising:
a subsystem configured to interact with the HSM, the subsystem and the HSM being distinct from one another.

23. A computer program product for managing cryptographic objects, the computer program product comprising a computer readable storage medium having program instructions embodied therewith, the program instructions executable by one or more processors that are concurrently performed at each client of a set of clients communicating with a respective hardware security module (HSM), to cause, at each client, to:
concurrently at the clients, receive entropy-based random numbers from one or more certificate authorities;
access, by a first entity, an entropy-based random number generated by a second entity subsequent to receiving the entropy-based random numbers;
instruct to store this random number on the first computerized device entity; and
based on a deterministic algorithm:
interact with the HSM to generate a seed according to the random number accessed and a reference key of the HSM, the reference key of the HSM being one of residing in or derived by the HSM, the random number being stored in the HSM; and
seed a random number generator with the generated seed to generate one or more post-quantum secure cryptographic objects that are trust anchored to the reference key of the HSM.

24. A method of managing cryptographic objects, the steps being concurrently performed at each client of a set of clients communicating with a respective hardware security module (HSM), the method, at each client, comprising:
accessing, by a first entity, an entropy-based random number generated by a second entity;
instructing to store the random number on the first entity; and
based on a deterministic algorithm:
interacting with the HSM to generate a seed according to both a reference key of the HSM and the random number, the reference key of the HSM being one of residing in or derived by the HSM, the random number being stored in the HSM;
seeding a random number generator with the generated seed to generate one or more post-quantum secure cryptographic objects that are trust anchored to the reference key of the HSM;
at each client, using one or each of the one or more post-quantum secure cryptographic objects generated to perform a cryptographic operation;
after using said one or each of the one or more post-quantum secure cryptographic objects generated to perform said cryptographic operation, deleting said one or more of the cryptographic objects; and receiving random numbers at the clients from one or more certificate authorities, wherein said random numbers correspond to random numbers as initially accessed by the clients, so as for the clients to be able to regenerate the same one or more cryptographic objects as previously generated.

25. The method according to claim 24, further comprising:

prior to sending said random numbers to the clients, sending, from one or more certificate authorities, public keys of all of the clients to each of the clients, for each client to be able to verify an authenticity of a random number received thereat.

26. A computerized system for managing cryptographic objects, the system comprising:

a random number generator;

storage means storing instructions; and a hardware processing means configured to execute said instructions being concurrently performed at each client of a set of clients communicating with a respective hardware security module (HSM), so as, at each client, to:

access an entropy-based random number generated by a second entity;

instruct to store the random number on the first entity; and based on a deterministic algorithm:

interact with the HSM to generate a seed according to both a reference key of the HSM and the random number, the reference key of the HSM being one of residing in or derived by the HSM, the random number being stored in the HSM;

seed a random number generator with the generated seed to generate one or more post-quantum secure cryptographic objects that are trust anchored to the reference key of the HSM;

at each client, use one or each of the one or more post-quantum secure cryptographic objects generated to perform a cryptographic operation;

after using said one or each of the one or more post-quantum secure cryptographic objects generated to perform said cryptographic operation, delete said one or more of the cryptographic objects; and receive random numbers at the clients from one or more certificate authorities, wherein said random numbers correspond to random numbers as initially accessed by the clients, so as for the clients to be able to regenerate the same one or more cryptographic objects as previously generated.

27. The computerized system according to claim 26, wherein said instructions further comprise:

prior to sending said random numbers to the clients, sending, from one or more certificate authorities, public keys of all of the clients to each of the clients, for each client to be able to verify an authenticity of a random number received thereat.

28. A computer program product for managing cryptographic objects, the computer program product comprising a computer readable storage medium having program instructions embodied therewith, the program instructions executable by one or more processors that are concurrently performed at each client of a set of clients communicating with a respective hardware security module (HSM), to cause, at each client, to:

access, by a first entity, an entropy-based random number generated by a second entity;

instruct to store the random number on the first entity; and based on a deterministic algorithm:

interact with the HSM to generate a seed according to both a reference key of the HSM and the random number, the reference key of the HSM being one of residing in or derived by the HSM, the random number being stored in the HSM;

seed a random number generator with the generated seed to generate one or more post-quantum secure cryptographic objects that are trust anchored to the reference key of the HSM;

at each client, use one or each of the one or more post-quantum secure cryptographic objects generated to perform a cryptographic operation;

after using said one or each of the one or more post-quantum secure cryptographic objects generated to perform said cryptographic operation, delete said one or more of the cryptographic objects; and receive random numbers at the clients from one or more certificate authorities, wherein said random numbers correspond to random numbers as initially accessed by the clients, so as for the clients to be able to regenerate the same one or more cryptographic objects as previously generated.

29. The computer program product according to claim 28, wherein the program instructions further comprise:

prior to sending said random numbers to the clients, sending, from one or more certificate authorities, public keys of all of the clients to each of the clients, for each client to be able to verify an authenticity of a random number received thereat.

* * * * *